(12) United States Patent
Orlassino

(10) Patent No.: US 8,150,372 B2
(45) Date of Patent: Apr. 3, 2012

(54) METHOD AND SYSTEM FOR DISTRIBUTING DATA WITHIN A GROUP OF MOBILE UNITS

(75) Inventor: Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1135 days.

(21) Appl. No.: 11/864,151

(22) Filed: Sep. 28, 2007

(65) Prior Publication Data

US 2009/0088133 A1    Apr. 2, 2009

(51) Int. Cl.
*H04M 3/16* (2006.01)
*H04W 24/00* (2009.01)
(52) U.S. Cl. .................... 455/411; 455/456.5
(58) Field of Classification Search ........... 455/411, 455/445, 456.5, 514, 557, 456.1, 437, 41.2, 455/550.1, 434, 425; 370/328, 337, 335, 370/254, 329, 331, 341, 345; 725/110; 710/316; 709/219
See application file for complete search history.

(56) References Cited

U.S. PATENT DOCUMENTS

| | | | | |
|---|---|---|---|---|
| 7,305,511 B2 * | 12/2007 | Barrett et al. | ................. | 710/316 |
| 7,684,785 B2 * | 3/2010 | Le Bars et al. | ................. | 455/411 |
| 7,809,381 B2 * | 10/2010 | Aborn et al. | ................. | 455/456.5 |
| 7,852,801 B2 * | 12/2010 | Stamoulis et al. | ............ | 370/328 |
| 2004/0102183 A1 * | 5/2004 | Haub et al. | ..................... | 455/411 |
| 2005/0266854 A1 * | 12/2005 | Niiho et al. | .................. | 455/445 |
| 2007/0083906 A1 * | 4/2007 | Welingkar | .................... | 725/110 |

* cited by examiner

*Primary Examiner* — Kiet Doan

(57) ABSTRACT

Described is a method for writing data onto a storage device from a wireless access point ("AP"), providing the data to a master mobile unit ("MMU"), authenticating an identity of the MMU at the AP and transmitting the data from the MMU to at least one other mobile unit ("MU"). Also described is a device having a connector coupling a storage device to the device, the storage device including data received from a network device and a transceiver communicating with the network device to authenticate the device, wherein when the device is authenticated, the transceiver further transmits the data to at least a first mobile unit ("MU").

17 Claims, 6 Drawing Sheets

METHOD AND SYSTEM FOR DISTRIBUTING DATA WITHIN A GROUP OF MOBILE UNITS

FIELD OF THE INVENTION

The present invention relates to systems and methods used for distributing data to multiple mobile computing devices within a communications network. Specifically, the present invention is related to systems and methods for automatically distributing data among the devices within a group or a family in order to securely and efficiently managing the information and software for each device while simultaneously providing wireless network access to the entire family of devices.

BACKGROUND

Wireless networking has emerged as an inexpensive technology for connecting multiple users with other users within a wireless coverage area of a network as well as providing connections to other external networks, such as the World Wide Web. An exemplary wireless network may be a wireless local area network ("WLAN") for providing radio communication between several devices using at least one wireless protocol, such as those of the 802.1x standards. A wireless local area network may use radio frequency ("RF") communication channels to communicate between multiple mobile units ("MUs") and multiple stationary access points. The access points or access ports (both may be referred to herein as "APs") of the WLAN may be positioned in various location of the environment to prevent any coverage gaps of the wireless coverage.

In order to standardize the communications over a WLAN, the MUs may be equipped with wireless fidelity ("Wi-Fi") capabilities, such as compatibility with one or more of the various 802.11x standards (i.e., 802.11a, 802.11b, 802.11g, etc.). The 802.11 standards are a set of Wi-Fi standards established by the Institute of Electrical and Electronics Engineers ("IEEE") in order to govern systems for wireless networking transmissions.

An enterprise may deploy a wireless network in order to provide wireless coverage throughout the operating environment of the enterprise. A WLAN offers the enterprise several benefits ranging from cost efficiency to flexibility in installation and scaling. Furthermore, an operating environment having a limited wired infrastructure may easily be converted into WLAN, offering mobility to compatible wireless devices throughout the environment. However, while WLAN architectures may provide several units with network connectivity, issues such as network security and access control may compromise the privacy and safety of the data and/or users of the network. Since the signal transmitted by the AP may be intercepted by unknown and/or unwanted MUs, these unwanted MUs may be provided with unauthorized access to the WLAN.

SUMMARY OF THE INVENTION

Exemplary embodiments of the present invention relate to a method for writing data onto a storage device from a wireless access point ("AP"), providing the data to a master mobile unit ("MMU"), authenticating an identity of the MMU at the AP and transmitting the data from the MMU to at least one other mobile unit ("MU").

Another exemplary embodiment of the present invention relates to a device having a connector coupling a storage device to the device, the storage device including data received from a network device and a transceiver communicating with the network device to authenticate the device, wherein when the device is authenticated, the transceiver further transmits the data to at least a first mobile unit ("MU").

Further exemplary embodiments of the present invention relate to a storage device comprising a connector for physically coupling the storage device to a AP that provides access to the WLAN in an operating environment, and for physically coupling the storage device to a MMU within the operating environment, and a memory for storing data received from the AP while the storage device is coupled to the AP, wherein the MMU retrieves the data from the memory while the storage device is coupled to the MMU, wherein the data is used to authenticate the MMU and at least one other mobile unit with the AP within the WLAN.

Further exemplary embodiments relate to a method for writing data onto a storage device from a first MU, the first MU having access to a wireless network, providing the data from the first MU to a second MU via the storage device, authenticating the identity of the second MU at the first MU and transmitting the data from one of the first MU and the second MU to at least one further MU over the wireless network.

DETAILED DESCRIPTION

Figure 1:
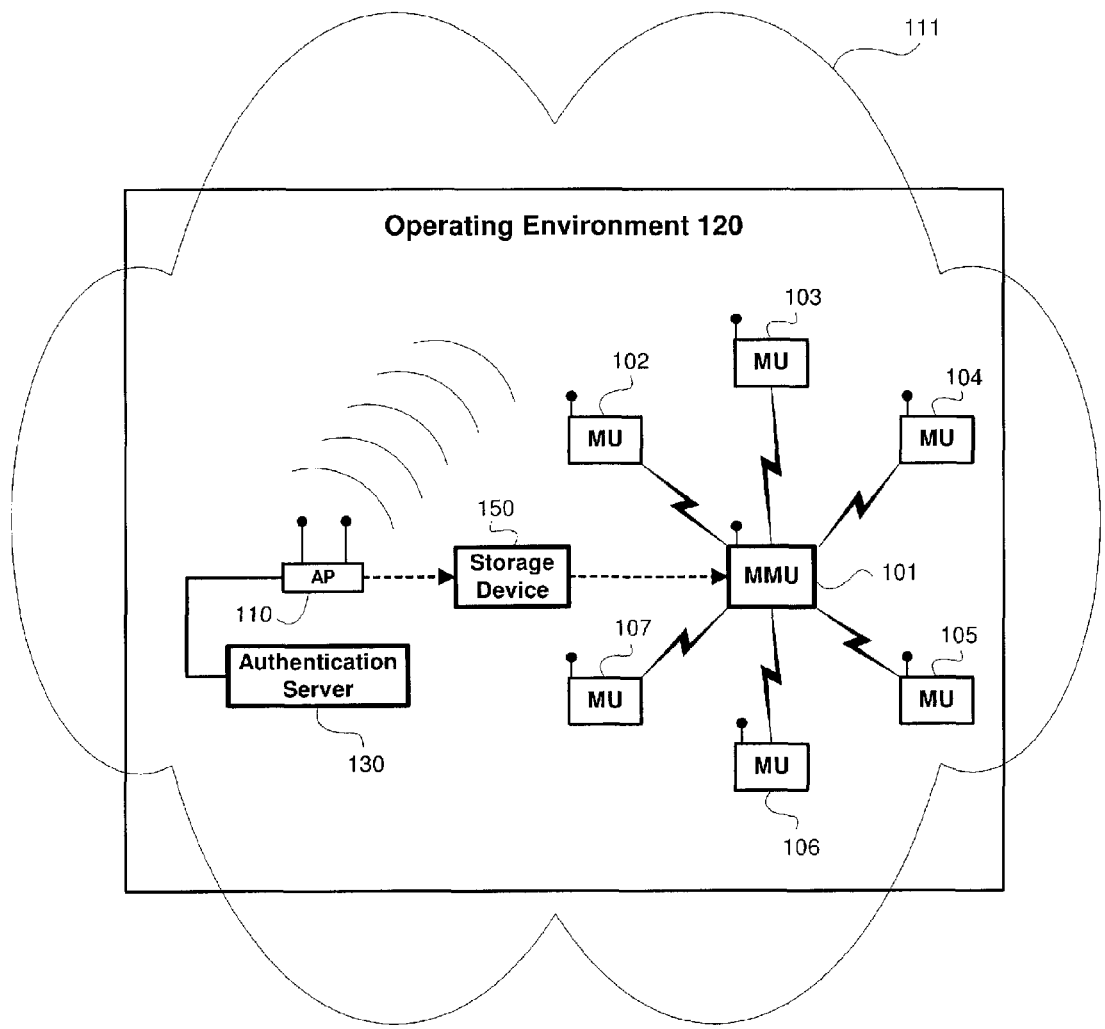
FIG. 1 shows an exemplary system for distributing data from the AP among the MUs within the family according to the exemplary embodiments of the present invention.

The present invention may be further understood with reference to the following description of exemplary embodiments and the related appended drawings, wherein like elements are provided with the same reference numerals. The present invention is related to systems and methods used for automatically distributing data to multiple mobile units ("MUs") within a communications network, such as, for example, within a peer-to-peer network architecture, a mesh network, etc. Specifically, the present invention is related to systems and methods for automatically self-replicating data among the MUs within a group or a family in order to securely and efficiently manage the information and software for each of the MUs while providing wireless network access to the entire family of MUs. The exemplary systems and methods may allow for data to be propagated between MUs in the background of the MUs (i.e., transparent to the user) thereby allowing for self-synchronization of the MUs within a specific group or family. According to exemplary embodiments of the present invention, the data may include, but is not limited to, data related to application data such as, for example, software/firmware upgrades, data for modifying system configurations, security data, business operation data (e.g., product pricing/information, sales data, pictures, video), data for updating device drivers, etc. Furthermore, the present invention allows for improved utility of access points ("APs") within the network while alleviating the overhead required for manually inputting the individual addresses for each of the permitted MUs within the network. Those skilled in the art will understand that the term "AP" according to the present invention may also be used to describe access ports or any other device that is capable of receiving and transmitting wireless signals within a network in accordance with the principles and functionality described herein. Thus, the use of a wireless Access Point is only exemplary. While the exemplary network may be described has being a wireless network infrastructure, the present invention may also be implemented into a wired infrastructure having a wireless AP.

It should be noted that the exemplary embodiments of the present invention may be implemented within any wireless network architecture, such as, for example, as a mesh network (e.g., an ad-hoc network), a wireless local area network ("WLAN"), a wireless personal area network ("WPAN") (e.g., Bluetooth, ZigBee), etc. Within each of the architectures, the network may be identified by an identifier, for example, an exemplary WLAN may be identified by a service set identifier ("SSID"). The SSID may be defined as a label that uniquely identifies the WLAN. Each of the devices on the WLAN may use the same SSID in order to establish communications with the AP. On a public network, the AP may be configured to broadcast its SSID so that MUs searching for a network connection can discover it. Thus, the broadcasting of the SSID may allow each of the MUs to set its own SSID to match the SSID of the AP, thereby allowing for automatic communication with the AP. However, within a business enterprise, the operator may wish to keep the network private and secure. A private WLAN may utilize APs that are configured to suppress the SSID broadcast from unauthorized MUs. According to the preferred embodiments of the present invention, the exemplary WLAN described throughout the disclosure may be a private WLAN. A private WLAN may be deployed in an operating environment such as a virtual private network ("VPN") of a business enterprise. Thus, the AP may provide secure network access to a plurality of MUs within the range of the AP, wherein the network is the Internet, an intranet, a LAN, or any other network architecture.

Furthermore, exemplary embodiments of the present invention may include a type of authentication in which the AP acts as an authentication agent. This may enable the username and password to be transmitted in an encrypted form to protect them against unauthorized MUs. The AP may encrypt the data that is transmitted and received in order to provide an additional level of security against unauthorized MUs. A common encryption scheme that may be used is a security protocol, such as a wired equivalent privacy ("WEP") key. The WEP key may encrypt and decrypt data transmissions between the AP and authorized MUs, thereby allowing the AP to authenticate the MUs and provide a level of security equivalent to that of a wired network. In WEP encryption, a password may be used in a hashing algorithm, or hash function, in order to generate a keyword. This keyword may then be used in another algorithm to encrypt and decrypt data. With WEP encryption, only those MUs having the proper combination of SSID and keyword may establish a connection and communicate with the AP over the WLAN.

Additional security systems contemplated within the exemplary embodiments of the present invention include Wi-Fi Protected Access ("WPA"), WPA2, Temporal Key Integrity Protection ("TKIP," also known as WEP2), basis Extension Authentication Protocol ("EAP"), and other extensible authentication protocols.

In addition to above referenced protocols, exemplary embodiments of the present invention may utilize a challenge-response method, such as, for example, a Challenge-Handshake Authentication Protocol ("CHAP"), as an authentication method. Rather than the password from the AP, the CHAP method may send a representation of the password in the form of a challenge message to the MUs during the authentication process. CHAP may be defined as an authentication scheme used by Point-to-Point Protocol ("PPP"), e.g., a direct connection, servers in order to validate the identity of MUs within the coverage range of the AP. CHAP may periodically verify the identity of each of the MUs by using an exemplary three-way handshake. The handshake may occur at the time of establishing the initial link. Furthermore, the handshake may also occur at any time afterward.

The verification may be based on shared security data, such as, for example a password of the MU. An exemplary handshake may allow each of the MUs to send a connection request to the AP to establish an initial link between the requesting MU and the AP. The AP may send a challenge to each of the MUs via an authentication server. Specifically, the authentication server of the AP may transmit the challenge message to each of the requesting MUs. The MUs may use a one-way hash function, such as, for example, Message Digest algorithm 5 ("MD5"), to compute a hash result based on the challenge and a hash result computed from the password. A hash function may be described as providing one-way encryption. Calculating the hash result for a data block is easy, but determining the original data block from the hash result is mathematically infeasible. The MU may send a hash result to the authentication server of the AP. The authentication server, which also has access to the hash result of the user's password, performs the same calculation using the hash algorithm to determine an expected result and compares the expected result to the result sent by the requesting MUs. If the results match for a particular MU, the authentication server may acknowledge the MU as an authentic to the AP. Otherwise the authentication server may instruct the AP to terminate the connection with the MU. It should be noted that the authentication server may send additional challenges to each of the MUs at random intervals.

For each of the MUs that are successfully authenticated, the authentication server may notify the AP of the successful authentication of the specific MU. All future network traffic from the authenticated MUs may then passes through the AP unimpeded and unaltered during normal operation of the system. However, in the event that the authentication of one of the MUs fails, that specific MU may be denied access to the AP over the network.

FIG. 1 shows an exemplary system 100 for distributing data from the AP 110 among the plurality of MUs 101-107 within the family according to the present invention. The exemplary system 100 may utilize a WLAN architecture 111 to provide continuous wireless coverage throughout an operating environment 120. Thus, the WLAN 111 may be described as a network infrastructure that allows for wireless devices, such as MUs 101-107, to be in communication with the AP 110 via radio waves. Those skilled in the art will understand that the system 100 is only exemplary and that the present invention may be applied to any type of wireless network topology.

According to exemplary embodiments of the present invention, the operating environment 120 may be within a large establishment, or operating environment, such as, for example, a business office, a department store, a mall, a warehouse, a storage lot, a home, etc. The operating environment 120 may maintain the WLAN 111 in order to provide continuous wireless coverage throughout multiple areas of the establishment. MUs 101-107 may thus be deployed within this coverage to initiate communication with the AP 110 of the WLAN 111. Advantageously, the WLAN 111 may be set up within an establishment in an unobtrusive and inexpensive manner. Furthermore, the elimination of wires allows for the components of the WLAN 111 infrastructure to be placed in various locations and easily repositioned throughout the operating environment 120.

Each of the MUs 101-107 may include an antenna for communicating with the AP 110, as well as other MUs. In addition, each of the MUs 101-107 may include a unique identification, such as, for example, an Internet Protocol ("IP") address or a Medium Access Control ("MAC") address. Furthermore, one or more of the MUs 101-107, such as, for example, MU 101, may be designated the Master MU ("MMU 101"). The MMU 101 may be in communication with each remaining MUs 102-107 of the family, wherein the communication may be within either a wired or a wireless setting. The MUs 102-107 may be in wireless communication with the MMU 101. This wireless communication may be via a short-ranged radio frequency, such as, for example, a wireless personal area network standard, e.g., Bluetooth IEEE 802.15.1. Thus, the MMU 101 may transmit and receive data with each of the other MUs 102-107 via the wireless connection, as described in FIG. 1. Alternatively, within an exemplary wired setting, the MMU 101 may be coupled to each of the other MUs 102-107 via a centralized location. The exemplary wired setting will be described in greater detail below. While FIG. 1 illustrates the MMU 101 as the only Master MU within the system 100, it is important to note that according to alternate embodiments of the present invention, an additional or all of the MUs 101-107 may act as a plurality MMUs. As will be described in further detail below, some or all of the MUs 101-107 may serve as peers to one another.

According to exemplary embodiments of the present invention, the system 100 may further include a removable piece of hardware, such as a swappable storage device 150. Specifically, the storage device 150 may be couplable to the AP 110 and the MMU 101, allowing information storage on the storage device 150 to be exchanges between the AP 110 and the MMU 101. In addition, the storage device 150 may be couplable to the other MUs 102-107. Examples of the exemplary storage device 150 may include, but are not limited to, a non-removable memory within the MMU, a primary memory attached to the MMU via a bus, a universal serial bus ("USB") mass storage device (e.g., a memory stick), a secure digital ("SD") card, a mini SD card, a flash memory card, a smart media card, a Personal Computer Memory Card Industry Association card ("PCMCIA card"), a subscriber identity module ("SIM") card, and any removable integrated circuit ("IC") card that may be placed in electrical contact within the AP 110 and the MMU 101. Furthermore, the storage device 150 may be writeable to receive data from the AP 110 when coupled to the AP 110 and may be readable to provide the data to the MMU 101 when coupled to the MMU 101.

The data that is written onto the storage device 150 may include configuration data, general files, routine software/firmware upgrades, data for modifying system configurations, security data, business operation data (e.g., product pricing/information, sales data, pictures, video), data for updating device drivers, etc., thereby allowing for routine system maintenance and upgrades to the software and/or firmware running on each of the MUs 101-107 within the operating environment 120. For example, the data may include application data related to business operations, modifications to software configurations, upgrades to the software and/or drivers, security data, etc. The business operations data may include, for example, customer and product information, product pricing, sales information, pictures, videos, etc. The security data may include, for example, key information or certificate information. Key information may describe a piece of information that controls the operation of the hash algorithm. During the encryption process, a key may specify the particular transformation of plaintext into "ciphertext." Likewise, during the decryption process, the ciphertext may be transformed back to plaintext. Specifically, the key information may be used in conjunction with digital signature schemes and keyed-hash functions often used for authentication, such as message authentication codes. One skilled in the art would understand that values from an exemplary message authentication code may be generated and verified using the same key information. Thus, the sender and receiver of a message may agree on the key or keys before initiating communications, as is the case with symmetric encryption. As applied to exemplary embodiments of the present invention, the AP 110 and the MMU 101 may agree on key information for connecting each of the authorized MUs 102-107 to the WLAN 111 via the AP 110.

Alternatively, the security data on the storage device 150 may be certificate information. Certificate information, may be described as a technique wherein a server (e.g., the authentication server 130 of the MMU 101) may issue digital certificates for use between multiple trusted parties (e.g., the other MUs 102-107). The MMU authentication server 130 may issue certificate information that states that the MMU authentication 130 server attests that identifiers (e.g., IP addresses, MAC addresses, etc.) contained in the certificate information belongs to a particular MU noted within the certificate information. The obligation of the MMU authentication server 130 may be to verify and authenticate the MU's credentials, so that the AP 101 may be able to acknowledge and trust the certificate information. After the MMU 101 verifies the certificate information of the other MUs 102-107, each authenticated MU may identify itself to the AP 110 as a secure device and then be provided with access to the WLAN 111 via the AP 110.

It is important to note that while FIG. 1 illustrates a single MMU 101, one of skill in the art would understand that a plurality of MUs may act as a master MU. Optionally, there may be multiple APs used throughout the operating environment 120 to extend the coverage area for very large areas such as, for example, providing wireless coverage on multiple floors of a building. Range extending devices (not shown) or signal repeating (not shown) devices may also be used to increase the range of the AP 110. Regardless of the number of APs implemented within the operating environment 120, each of the APs may be placed in direct communication with the authentication server 130. It should also be noted that while the authentication server 130 is shown as a separate component, the functionality described herein for the authentication server 130 may be implemented in the AP 110.

Figure 2:
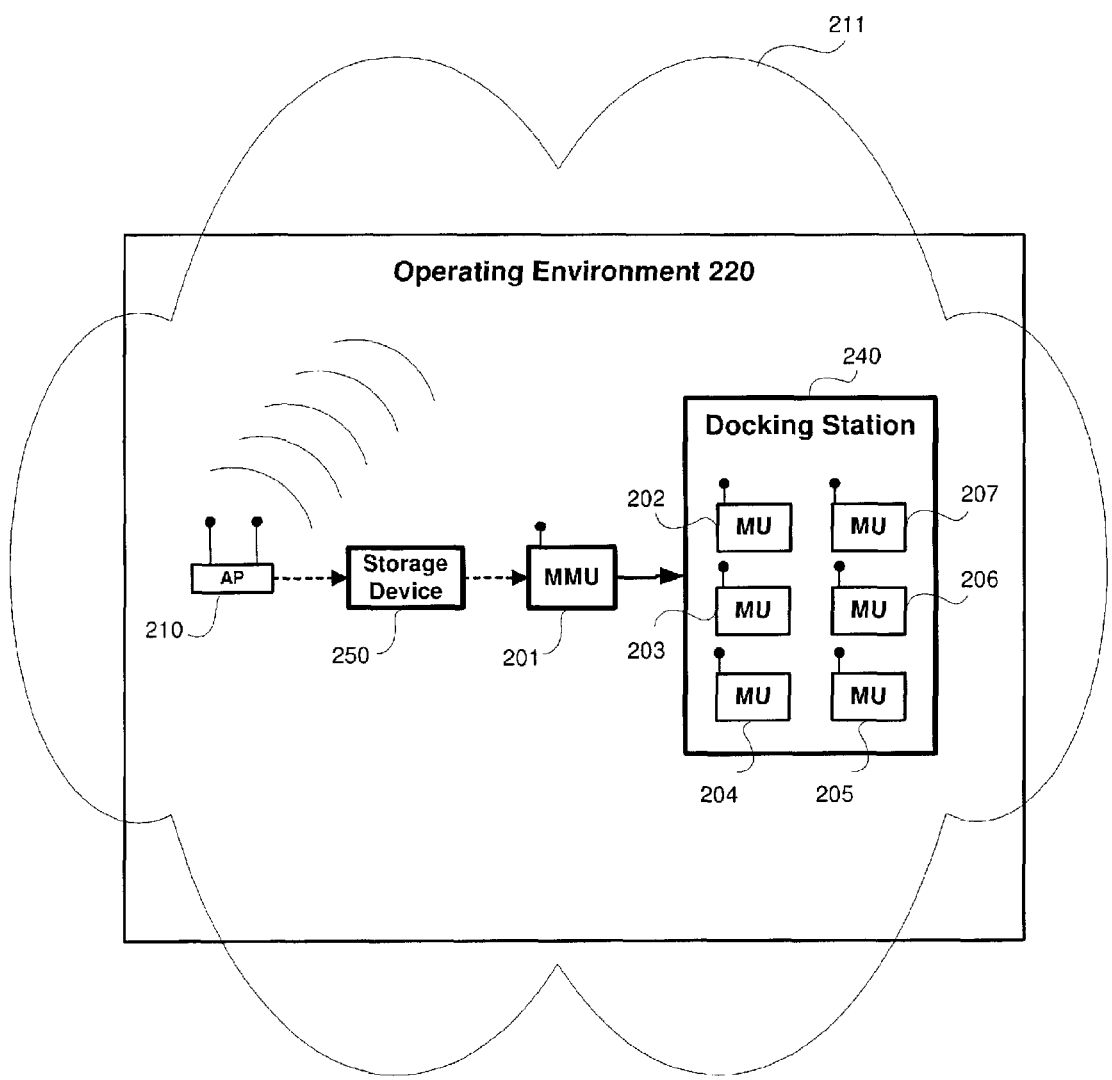
FIG. 2 shows an alternative system for distributing data from the AP among the plurality of MUs within the family according to the exemplary embodiments of the present invention.

FIG. 2 shows an alternative embodiment of a system 200 for distributing data from the AP 210 among the plurality of MUs 201-207 within the family according to the present invention. Similar to the system 100, the AP 210 may provide access to a WLAN 211 throughout an operating environment 220 and each of the MUs 201-207 may include an antenna for communicating with the AP 210. However, as opposed to the MUs 201-207 being in wireless communication with other MUs 201-207, there may be a wired connection between the MUs 201-207. One of the MUs, e.g., 201, may be designated the MMU 201, wherein the MMU 201 may be wired to a centralized location such as, for example, a docking station 240. While the MUs 202-207 are docked in the docking station 240, the MMU 201 may connect with the docking station 240 to communicate with each of the other MUs 202-207.

Thus, as opposed to relying on the wireless transmission of the data from a storage device 250, the docking station 240 allows for each of the other MUs 202-207 to easily gain access to the MMU 201. Specifically, a wired transmission may allow for a higher data transfer rate. Once the data is transmitted among the MUs 202-207, the MUs 202-207 may be removed from the docking station and communicate wirelessly with the AP 210. The MUs 202-207 may be identified and authenticated by the AP 210 in order to gain access to the WLAN 211.

It is important to note that the docking station 240 may be capable of providing additional resources to all of the MUs 201-207. For example, if each of the MUs 201-207 has an internal battery, the docking station 240 may act as a power source, thereby recharging the batteries of the MUs 201-207 while docked. Additionally, for example, the docking station 240 may act as central memory device for each of the MUs 201-207. According to this example, the MUs 201-207 may periodically dump any gathered information into the central memory device while docked. Once the gather information is dumped in the central memory device, the information may be easily collaborated and analyzed. Those of skill in the art would understand that there are several advantages to providing the MUs 201-207 with a wired connection to the centralized location, such as the docking station 240.

In an alternative embodiment of the system 200, the storage device 250 may be coupled directly to the docking station 240. According to this embodiment of the present invention, the docking station 240 may include a receiving arrangement adapted to couple with and read the storage device 250. For example, the storage device 250 may be in the form of a USB memory stick and the receiving arrangement of the docking station 240 may be a USB port. Once the storage device 250 is coupled to the docking station 240, the data from the storage device 250 may be read by the docking station 240 and may then be transferred to any of the MUs 201-207 that are docked in the docking station 240.

Figure 3:
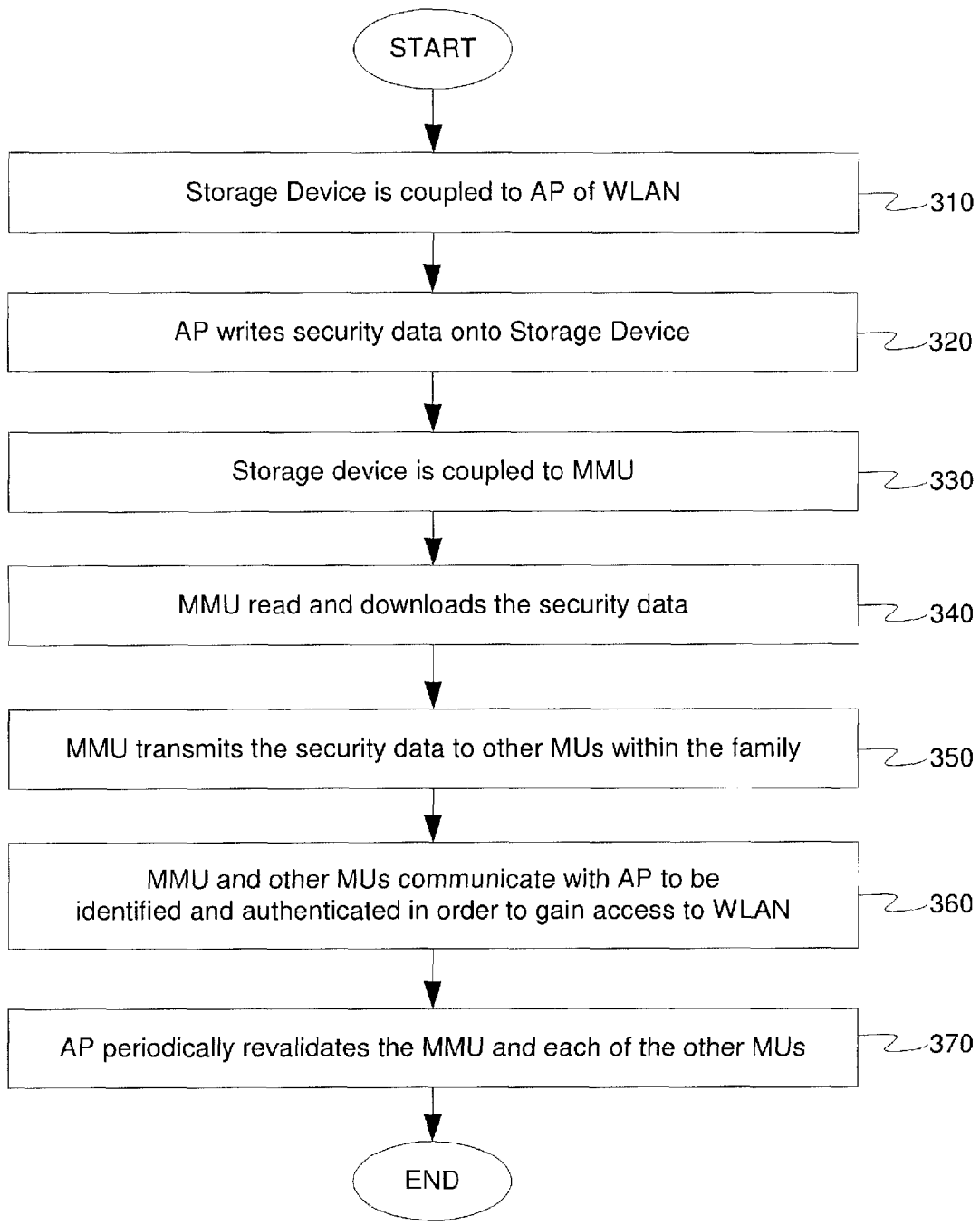
FIG. 3 shows an exemplary method for distributing data from the AP among the MUs within the family according to the exemplary embodiments of the present invention.

FIG. 3 represents an exemplary method 300 for distributing data from the AP 110 among the plurality of MUs 101-107 within a family according to the present invention. The exemplary method 300 will be described with reference to the exemplary system 100 of FIG. 1. Examples of the MUs 101-107 may include desktop computers, laptop computers, voice over IP ("VoIP") telephone receivers, personal digital assistants ("PDAs"), portable barcode scanners, and any mobile computing devices. According to the present invention, the method 300 may allow for the entire family of MUs 101-107 to be authenticated in order to access the WLAN 111 via the AP 110.

As described above, the WLAN 111 may be implemented within a business enterprise and the AP 110 of the WLAN 111 may provide requesting MUs within the enterprise with access to the AP 110. Furthermore, the term family may refer to grouping of MUs within the business enterprise. However, without restricting access to the WLAN 111, any unauthorized MUs (e.g., outside of the family) having a wireless transceiver may gain access to the WLAN 111 via the AP 110. Thus, a rogue laptop from an unknown location may establish a wireless connection with the WLAN 111 if the laptop is within range of the AP 110. According to exemplary embodiments of the present invention, the AP 110 may restrict access over the WLAN 111 to authenticated MUs. In order for the AP 110 to authenticate the MUs 101-107, data may be transmitted to each of the MUs 101-107 via the storage device 150.

In step 310, the storage device 150 is coupled to the AP 110 of the network 101. As described above, an exemplary storage device 150 may be a USB memory stick having flash memory. According to this example, the storage device 150 may be couplable to a USB port on the AP 110.

In step 320, the AP 110 writes data onto the storage device 150. As described above, the data may be security data in the form of key information, certificate information, etc. In addition, the data may be encrypted when place onto the storage device 150. The encryption of the data may prevent unauthorized access to any of the information written by the AP 110 onto the storage device 150. Further embodiments may include the use of password protection and/or biometric identification in order to confirm the identity of the storage device 150 users. According to an embodiment of the present invention, the data may designate different level of network access among each of the MUs 101-107.

In step 330, the storage device 150 is coupled to the MMU 101 in order to allow the MMU 101 to access the WLAN 111 through the AP 110. Initially, the AP 110 may not provide network access to any of the MUs 101-107. This will initially prevent all MUs, including any unknown MUs within broadcasting range of the AP 110, from connecting to the WLAN 111. If the data on the storage device 150 is stored as encrypted data, the MMU 101 may include an appropriate cryptographic key in order to decrypt the data.

In step 340, the MMU 101 may read the data from the storage device 150 and download the information onto a local memory of the MMU 101. Once the storage device 150 is coupled to the MMU 101, the MMU 101 may communicate with the AP 110 over the WLAN 111 in order to be identified as a secured device. According to exemplary embodiment of the present invention, the communication between the AP 110 and the MMU 101 may be wireless communication. In addition, the MMU 101 may provide the AP 110 with specific identifying information, such as, for example, an IP address or MAC address of the MMU 101. The authentication between the AP 110 and the MMU 101 may be accomplished through an exemplary CHAP method. Upon identification and authentication of the MMU 101, the AP 110 may then provide the MMU 101 with access to the WLAN 111.

In step 350, the MMU 101 communicates with each of the other MUs 102-107 within the family in order to transmit the data. As described above, the communications between the MMU 101 and the other MUs 102-107 may a wired connection (e.g., via the docking station 240) or may be a wireless connection (e.g., via Bluetooth communication). According to an embodiment of the present invention, various levels of security may be granted to each of the other MUs 102-107. For example, MU 102 may be granted with a higher level of security (e.g., administrative security level) than the remaining MUs 103-107. This may allow the system 100 to designate and modify the network access provided to each of the MUs 101-107.

In step 360, each of the other MUs 102-107 within the family may download the data transmitted from the MMU 101, thereby allowing all of the MUs 101-107 of the family to communicate with the AP 110 over the WLAN 111. Similar to the identification of the MMU 101, the other MUs 102-107 may communicate with the AP 110 over the WLAN 111 in order to be identified as secured devices. Each of the MU 102-107 may provide the AP 110 with specific identifying information, such as, for example, respective IP addresses or MAC addresses of the MUs 102-107. The authentication between the AP 110 and the MUs 102-107 may be accomplished through an exemplary CHAP method. Upon identification and authentication of each of the MUs 102-107, the AP 110 may then provide the MUs 102-107 with access to the WLAN 111.

Thus, once all of the MUs 101-107 within the family have completed the authentication process and are accepted, the MUs 101-107 is ready to associate with the AP 110 optionally, in step 370, the AP 110 may revalidate each of the MUs 101-107 to maintain an authenticated association. In order to maintain an association with each of the MUs 101-107, the AP 110 may periodically send challenges to one or more of the MUs 101-107. The response provided by the MUs 101-107 for each challenge may reaffirm the identity and authenticity of each MUs 101-107.

According to an alternative embodiment of the present invention, the authentication server 130 may further verify the operation and location of each of the MUs 101-107 within the operating environment 120. Specifically, the authentication server 130 may keep each of the MUs 101-107 in synchronization with the authentication server 130 and the AP 110 within the system. For example, each of the MUs 101-107 may periodically transmit a beacon signal, in addition to respective location coordinates, to the AP 110. The beacon signal may be, for example, a group or family ownership signal allowing each MUs 101-107 within a particular group to associate with one another (e.g., determine the presence and/or absence of other MUs within the group through out the network). The beacon signal, along with the respective location coordinates, may be forwarded from the AP 110 to the authentication server 130 for processing, wherein the authentication server 130 may acknowledge the operation and location for each of the MUs 101-107.

In the event that one or more of the MUs 101-107 fails to transmit a beacon signal for a designated period of time, the MU may be disassociated with the authenticated family of MUs. Thus, the AP 110 may be instructed by the authentication server 130 to deny access to the WLAN 111 to any of the disassociated MUs. In other words, the authenticating server 130 may transmit the identifying information related to each of the disassociated MUs to the AP 110, and the AP 110 may then cease any communication with any MU that provides such identifying information. Furthermore, according to an exemplary embodiment of the present invention, the MU may not disassociate itself from the group or family. Instead the other MUs of that particular group may disassociate any one of the MUs that fails to provide an adequate beacon signal. For example, the MUs 101-106 of the group may collectively disassociate the MU 107 of the same group if none of the MUs 101-106 has received a beacon signal (or at least a consistent beacon signal) from the MU 107. Accordingly, the disassociated MU 107 may be removed from the group and the MU 107 may be wiped (i.e., purged of data and/or software on MU 107).

Furthermore, if the disassociated MU attempts to re-initiate communications with the AP 110, the AP 110 may transmit a security alert to the authentication server 130. Due to the fact that the disassociated MU failed to transmit the periodic beacon signal within a certain time frame, it may be assumed that the MU may have been stolen or tempered with, or alternative, an unauthorized device is replicating the operations of the MU. Thus, the security alert from the AP 110 to the authentication server 110 may be appropriate. Once the disassociated MU, or "rogue" MU, has been detained, a determination may be made as to whether the disassociated MU may reinitiate operations within the WLAN 111. The identity of the disassociated MU may be re-authenticated by the authentication server 130, and MU may return to communication with the AP 110 within with WLAN 111.

Figure 4:
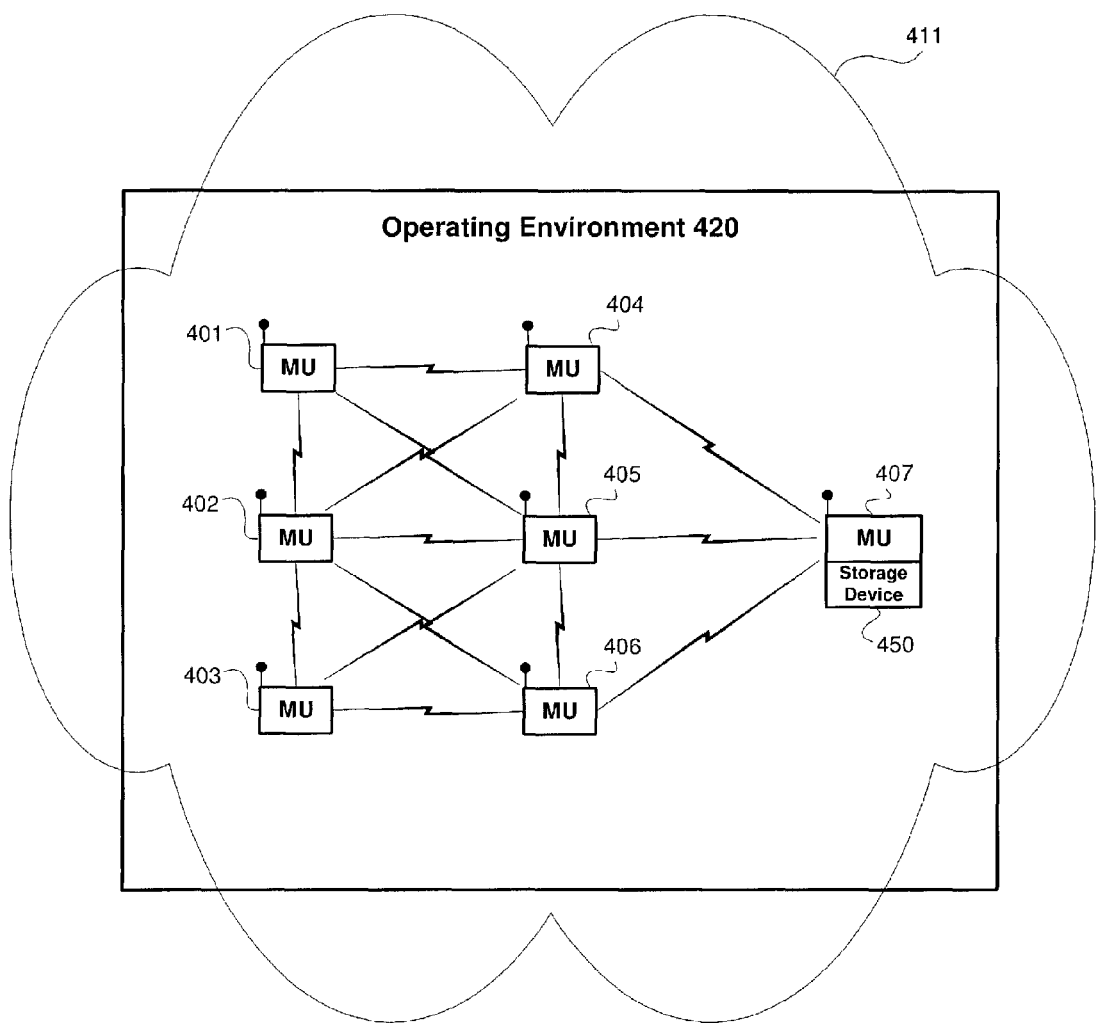
FIG. 4 shows a further alternative system according to the exemplary embodiments of the present invention, wherein a plurality of exemplary MUs operate using a peer-to-peer approach as within, for example, a mesh network infrastructure.

FIG. 4 shows a further alternative system 400 according to embodiments of the present invention, wherein a plurality of exemplary MUs 401-407 operate using a peer-to-peer scheme as within, for example, a mesh network infrastructure 411. Furthermore, each of the MUs 401-407 may act as an MMU in the mesh network 411, performing each of the functions described in the above detailed embodiments for the MMU. As described in the above, embodiments, the MUs 401-407 may allow for self-replication and self-synchronization of data between each of the MUs within a designated group or family. In addition, the propagation of data between each of the MUs 401-407 may be performed as a background application on the MU, transparent to the user. The mesh network 411 may be described as a co-operative networking architecture within operating environment 420 that may allow for peer-to-peer communications between available computing devices within the network. According to alternative embodiments of the present invention, the mesh network 411 may be distributed over a WLAN and route data (e.g., voice data, application data, control data, etc.) between multiple computing devices (i.e., nodes), such as, for example, MUs 401-407, within the network 411. Specifically, each of the nodes may act as repeaters to transmit data received from neighboring nodes to other computing devices that may be too far away to reach, thereby resulting in a network that can span large distances via peer-to-peer communications. While the MUs 401-407 of the mesh network 411 may communicate with one another, the system 400 may also include one or more APs (not shown) as well as an authentication server (not shown). It is important to note that while the exemplary embodiment illustrated in FIG. 4 show seven MUs throughout the mesh network 411, those skilled in the art would understand that any number of Mus may be used to according to the present invention. Furthermore, each of the MUs 401-407 may be a different computing device. For example, MU 401 may be desktop PC, while MU 402 may be a portable music player (e.g., MP3 storage device). Accordingly, exemplary embodiments of the present invention may allow for the wireless transfer of music data files between the desktop PC and the portable music player over the mesh network 411. It should be noted that while the exemplary network is described has being a wireless mesh network infrastructure 411, the present invention may also be implemented into a wired infrastructure having a wireless access point.

According to one embodiment of the present invention, the mesh network 411 may be a self-configuring mobile ad-hoc network ("MANET"), wherein each of the MUs 401-407 may be loosely coupled together, acting as individual mobile routers connected by wireless communication links. The MANET mesh network 411 may allow for the propagation of data between all of the MUs 401-407. As described in the above embodiments, the data may include, but is not limited to, data related to application data such as, for example, software/firmware upgrades, data for modifying system configurations, security data, business operation data (e.g., product pricing/information, sales data, pictures, video), data for updating device drivers, etc. The mesh network 411 may be extremely reliable, as each of the MUs 401-407 may be connected to several other MUs. If one MU drops out of the network 411, due to hardware failure, operating at full capacity, or any other reason, a neighboring MU may simply find another route to the destination. In other words, the mesh network 411 may allow for continuous connections and reconfiguration around unavailable paths (e.g., busy, broken, or obstructed paths) by hopping between each of the MUs 401-407 until the destination is reached.

Similar to the MUs described in the above embodiments, each of the MUs 401-407 may include an antenna for communicating with one another throughout the mesh network 411. In addition, the wireless communication links between the MUs 401-407 may be via a short-ranged radio frequency, such as, for example, a wireless personal area network standard, e.g., Bluetooth IEEE 802.15.1. Thus, each of the MUs 401-407 may transmit and receive data with each other via the wireless connection.

According to exemplary embodiments of the present invention, the system 400 may further include one or more removable pieces of hardware, such as a swappable storage device 450. Specifically, the storage device 450 may be couplable directly to any one of the MUs 401-407, allowing information storage on the storage device 450 to be read and received by the coupled MU. As described in the above embodiments, the data that is written onto the storage device 450 may include configuration data, and/or may allow for routine system maintenance and upgrades to the software and/or firmware running on each of the MUs 401-407 within the mesh network 411. For example, the data may include application data related to business operations, modifications to software configurations, upgrades to the software and/or drivers, security data, etc. The business operations data may include, for example, customer and product information, product pricing, sales information, pictures, videos, etc.

Throughout the mesh network 411, each of the MUs 401-407 may maintain communication with multiple computing devices (e.g., the other MUs, APs, etc.) in order to propagate the information received from the storage device 450 by any one of the MUs 401-407. For example, the MU 407 may be in wireless communication within the MUs 404, 405, and 406. In addition, the MU 407 may also be coupled directly to the storage device 450. While coupled, the MU 407 may read and receive any information contained on the storage device 450. Since the system 400 utilizes a mesh network 411, the information contained on the storage device 450 may be propagated throughout each of the MUs 401-407 via peer-to-peer communications. The peer-to-peer communications may be initiated with the MU 407. Thus, the MU 407 may transmit the information to the MUs 404, 405, and 406. Likewise, each of the MUs 404, 405, and 406 may then transmit the received information to further MUs, such as, the MUs 401, 402, and 403. Furthermore, if any one of the subsequent MUs 401-406 within the mesh network 411 is unavailable or is operating at maximum capacity while the MU 407 propagates the information, the mesh network 411 allows for one of the available MUs to simply establish a communication link around the unavailable MU, thereby permitting each available MU to receive the propagated information from the storage device 450. Thus, according to the alternative embodiment of the present invention, the system 400 may allow for peer-to-peer synchronization between each of the available MUs 401-407 during the propagation of information.

Figure 5:
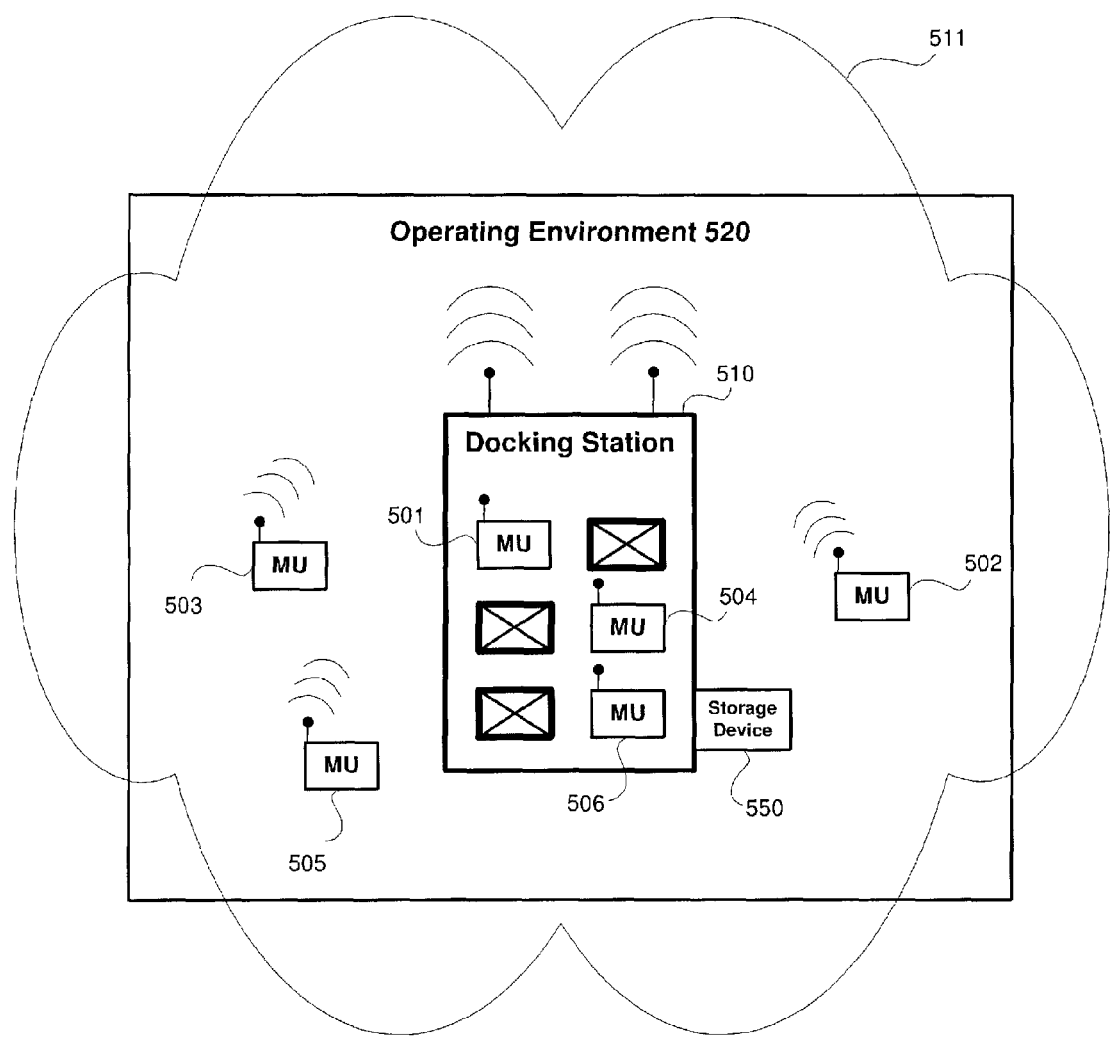
FIG. 5 shows a further alternative system according to the exemplary embodiments of the present invention including a plurality of exemplary MUs and an AP operate within an operating environment, wherein the AP may also serve as a docking station having multiple docking ports for receiving the MUs.

FIG. 5 shows a further alternative system 500 according to embodiments of the present invention including a plurality of exemplary MUs 501-506 and an AP 510 operating within an operating environment 520, wherein the AP 510 may also serve as a docking station having multiple docking ports for receiving the MUs 501-506. According to one embodiment of the alternative system 500, the AP 510 may be coupled directly to a storage device 550. As described in the above embodiments, the exemplary storage device 550 may be a hard drive or an optical drive on the AP 510, or it may be an SD card containing data insertable and readable to the AP 510. Upon receiving information from the storage device 550, the AP 510 may propagate the information to all of the MUs 501-506 throughout a WLAN 511 established in the operating environment 520. The information may include, for example, configuration data, general files, routine software/firmware upgrades, data for modifying system configurations, security data, business operation data (e.g., product pricing/information, sales data, pictures, video), data for updating device drivers, etc., thereby allowing for routine system maintenance and upgrades to the software and/or firmware running on each of the MUs 501-105 within the operating environment 520.

As described above, the exemplary system 501 may allow for data to be propagated between MUs 501-506 in the background of the MUs (i.e., transparent to the user). The MUs 501-506 may allow for self-replication and self-synchronization of data between each of the MUs within a designated group or family. In addition, the propagation of data between each of the MUs 501-506 may be performed as a background application on the MU, transparent to the user. Accordingly, the propagation of information may be via a wired transmission while any one of the MUs 501-506 is docked within one of the docking ports. Alternatively, or additionally, the AP 510 may propagate the information from the storage device 550 via a wireless communication link. Similar the embodiments described above, the wireless communication links between the MUs 501-506 and the AP 510 may be a short-ranged radio frequency, such as, for example, a wireless personal area network standard, e.g., Bluetooth IEEE 802.15.1. Furthermore, each of the MU 501-506 may transmit and receive data with each other via the wireless connection.

As illustrated in FIG. 5, some of the MUs 501-506 may be docked within one of the ports of the AP 510 while other MUs may be roaming throughout the operating environment 520. For example, the MUs 501, 504, and 506 are currently docked within one of the available ports of the AP 510, thereby creating a wired communication link with the AP 510. While connected to the AP 510 via the wired communication link, the MUs 501, 504, and 506 may receive any information the AP 510 received from the inserted storage device 550. Thus, the alternative system 500 of the present invention may allow for improved utility of AP 510 within the WLAN 511 by alleviating the overhead required for manually inputting information for each of the MUs.

The remaining MUs 502, 503, and 505 may be roaming throughout the WLAN 511, maintaining wireless communication links with the AP 510, as well as maintaining communication links with any of the other MUs. The information received from the storage device 550 may be transmitted wirelessly by the AP 510 to any of the roaming MUs 502, 503, and 505 in order to provide the MUs 502, 503, 505 with configuration data, software updates, etc. Alternatively, the AP 510 may wait until the MUs 502, 503, 505 are placed in the ports of the AP 510 before the information is transferred.

Similar to the embodiments described above, one of the roaming MUs 502, 503, 505 may be disassociated from the AP 510. Specifically, in the event that any of the roaming MUs 502, 503, 505 fails to communicate (e.g., via a beacon signal) with the AP 510 for a designated period of time, that MU may be disassociated by the AP 510. The AP 510 may therefore deny access to the WLAN 511 to any of the disassociated MUs. Alternatively, the MUs of a group or family may disassociate the MU if the MUs fail to receive any communication (e.g., the beacon signal) from the MU. Furthermore, if the disassociated MU attempts to re-initiate communications with the AP 510 or any of the other MUs of the group, the AP 510 or one of the MUs may transmit a security alert. In addition, the software on the disassociated MU may be wiped. Due to the fact that the disassociated MU failed to communicate with the AP 510 or another MU within a certain time frame, it may be assumed that the MU may have been stolen or tempered with, or alternative, an unauthorized device is replicating the operations of the MU. Thus, the security alert from the AP 510 or the other MU may be appropriate. Upon detaining the disassociated MU, a determination may be made as to whether the disassociated MU may reinitiate operations within the WLAN 511. The identity of the disassociated MU may be re-authenticated, and MU may return to communication with the AP 510 within with WLAN 511.

Figure 6:
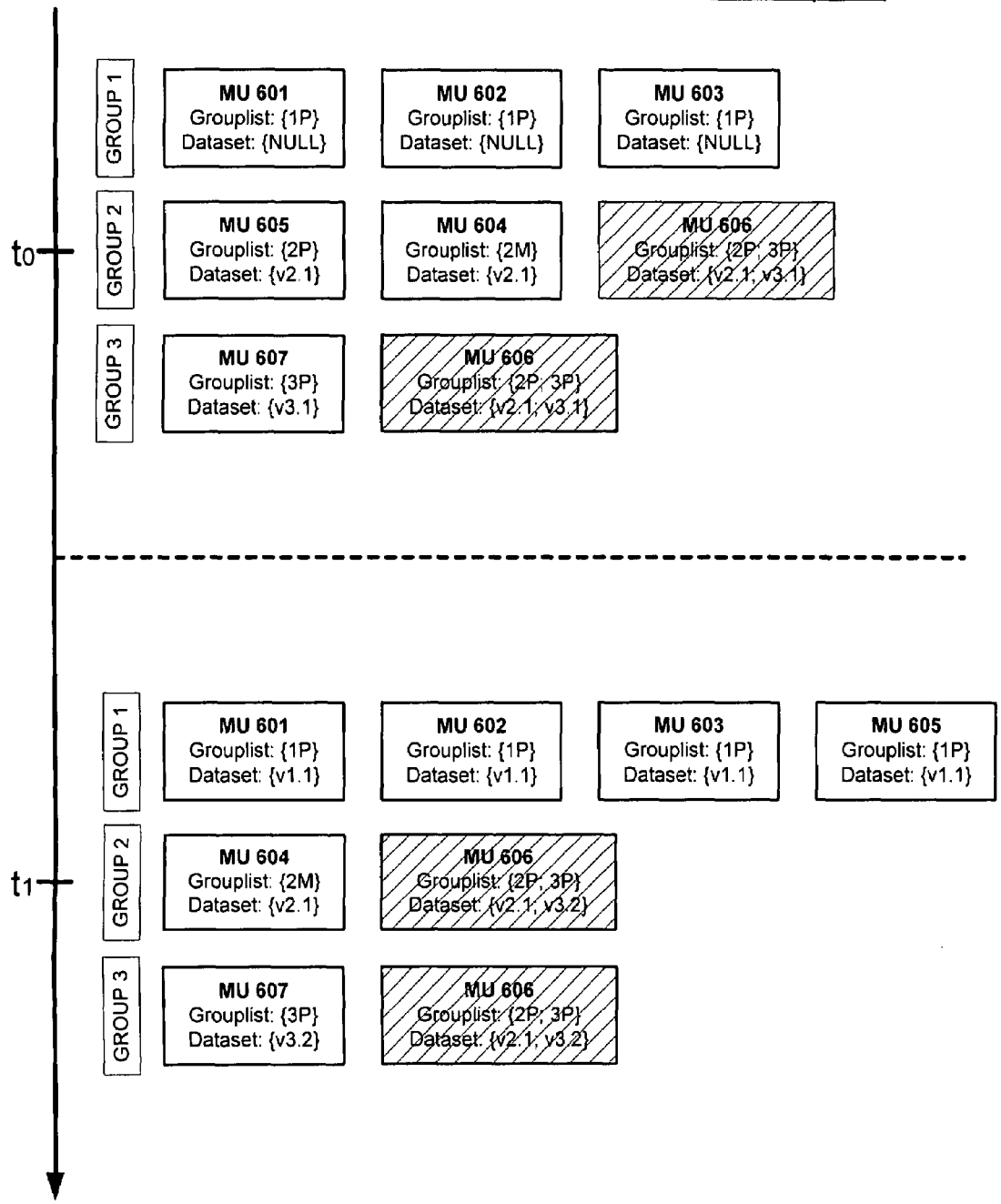
FIG. 6 shows a time graph illustrating group associations between multiple MUs within multiple groups and propagation of datasets over time according to the exemplary embodiments of the present invention.

FIG. 6 shows a time graph 600 illustrating group associations between multiple MUs 601-607 within multiple groups of a network and propagation of datasets over time according to the exemplary embodiments of the present invention, wherein each of the MUs 601-607 may include one or more Grouplist values and one or more Dataset values.

According to the exemplary illustration, the network may consist of three device families, or MU groups, namely Groups 1-3. Each of the MUs 601-607 may list any groups in which the MU is associated with on a Grouplist. Furthermore, the Grouplist may also indicate a device type, such as a peer device ("P"), a master device ("M"), etc. For example, each peer MU associated with Group 1 may list "1P" as a Grouplist value. Likewise, each master MU associated within Group 1 may list "1M" as a Grouplist value. In addition, for each group that the MUs 601-607 are associated with, the Peer/Master MUs of the same Group may propagate data amongst one another, thereby updating the Dataset values for each of the MUs of similar Groups.

It should be noted that each master MU associated with a group may synchronize any changes in the data between group members. Specifically, the master MU may replicate and transmit the latest versions of data available to each of the devices associated with that particular group. Furthermore, a group having multiple master MUs may allows for data synchronization amongst each of the master MU, wherein each of the master MUs may then replicate the data to associated peer MUs within the group. Accordingly, the peer MUs may not be permitted to replicate (or otherwise transmit) any changes to the data amongst the other MUs. For security reasons, this limitation on the peer MUs may prevent unauthorized changes from occurring within the group data. Thus, the group may be described as have a two-tier hierarchy, wherein only the master MUs may alter the data of the other MUs (masters and/or peers) within the group. However, according to an alternative embodiment of the present invention, the group may not contain any master MUs. In other words, the group may only be comprised of peer MUs (e.g., peer-nodes within a mesh network). According to this alternative embodiment, the peer MUs may be permitted to replicate and synchronize any data changes amongst each of the other peer MUs within the group. Thus, the two-tier hierarchy described in relation to the master to peer embodiment may be removed, thereby placing each MUs within a single tier.

According to FIG. 6, at an initial time (e.g., "$t_0$"), Group 1 may include MUs 601-603, Group 2 may include MUs 604-606, and Group 3 may include MUs 606 and 607. It should be noted that any one of the MUs 601-607 may be associated with multiple Groups within the network, such as MU 606 (grayed in FIG. 6) belonging to Groups 2 and 3. As described above, MUs may list the associated groups within the Grouplist and a current dataset version in the Dataset. Since the exemplary MUs 601-603 are peer MUs within Group 1, each of these MUs 601-603 may list "1P" in their respective Grouplists. According to the exemplary illustration, there is no dataset for the members of Group 1. Therefore, the MUs 601-603 may have a "NULL" value for their respective Datasets.

At time $t_0$, the Group 2 may include at least one master MU, MU 604, and two peer MUs, MUs 605 and 606. Therefore, the Grouplist for MU 604 may include "2M", while the Grouplists for 605 and 606 may include "2P." Since the MU 606 is a part of multiple groups, the Groupset for MU 606 may also include additional values, such as "3P." The Dataset value for members of Group 2 may be version 2.1 ("v2.1"), wherein the first number may represent the group and the second number may represent a sequential build number for tracking changes made to the dataset.

Furthermore, at time $t_0$, Group 3 may include MUs 606 and 607 and have a Dataset value of v3.1. Accordingly, both MUs 606 and 607, as peer devices, may list "3P" within the Grouplists. As the dataset for Group 3 is "v3.1", this value may be listed within the Datasets of the MUs 606 and 607. As described above, MU 606 may be associated with Groups 2 and 3, thus, the Grouplist for MU 606 may include "2P; 3P" and the Dataset may include "v2.1; v3.1." According to the exemplary embodiments of the present invention, peer MUs within the same family, or group, may propagate any data updates between the other MUs. Therefore, if MU 607 receives a dataset update more recent than v3.1, the MU 607 may propagate the updated data to MU 606.

As illustrated in FIG. 6, the group associations of the MU 601-607, as well as the datasets of the MUs 601-607, may changes over time. From the initial time, $t_0$, to an arbitrary time, $t_1$, several changes may occur to alter the settings of the MUs 601-607 within the network. These changes may include user-directed changes, network problems, outside influences, routine maintenance procedures, etc. For example, the member of Group 1 may receive a version update on the dataset. Since Group 1 initially had a NULL value in the dataset, the update may be consider an initial dataset for Group 1. According, each member of Group 1 may exhibit a changes in the Dataset from "NULL" to "v1.1." The updates dataset may be received and/or transmitted to other MUs of Group 1, including MUs that join the group at a later time. Thus, each MU in Group 1 may have the most recent version of the dataset.

Furthermore, according to FIG. 6, at time $t_1$, MU 605 may disassociate from Group 2 and associate with Group 1. Therefore, the Groupset for MU 605 may change from "2P" to "1P." Since MU 605 is now a member of Group 1, MU 605 may receive the latest version of the dataset for Group 1 from any of the other member MUs 601-603. Therefore, the initial Dataset for MU 605 (v2.1 from Group 2) may be deleted from the Dataset list of MU 605, and a new Dataset (v1.1 from Group 1) may be added to the Dataset list of MU 605.

Furthermore, according to FIG. 6, at time $t_1$, the MU 606 may receive a dataset update on the Group 3 dataset. Specifically, the MU 606 may update the dataset from "v3.1" to "v3.2." Since this update may only be for the Group 3 dataset, the Group 2 dataset of "v2.1" may remain unchanged on the MU 606. In addition, MU 606 may propagate the updated Group 3 data to any other MUs within Group 3, such as MU

607. Therefore, the MU 607 may also update to the latest dataset available within Group 3, and change from the dataset of "v3.1" to "v3.2."

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
    writing data onto a storage device from a wireless access point ("AP") when the storage device is coupled to the AP;
    providing the data to a master mobile unit ("MMU") when the storage device is coupled to the MMU;
    authenticating an identity of the MMU at the AP based on the data provided to the MMU;
    transmitting the data from the MMU to at least one other mobile unit ("MU");
    authenticating an identity of the at least one other MU at the AP based on the data provided to the at least one other MU;
    providing, to the MMU and the at least one other MU, access to a communications network via the AP based on the authentication of the MMU and the at least one other MU at the AP;
    transmitting a periodic beacon signal from the MMU and the at least one other MU to the AP;
    disassociating one of the MMU and the at least one other MU if the one of the MMU and the at least one other MU fails to transmit the periodic beacon signal to the AP within a predetermined period of time, thereby denying access to the communications network to the one of the MMU and the at least one other MU; and
    transmitting a security alert if the one of the disassociated MMU and the at least one other disassociated MU attempt to initiate communication with the AP.

2. The method according to claim 1, wherein transmitting the data includes one of data-synchronization and data-replication between the MMU and the at least one other MU.

3. The method according to claim 1, wherein the communication between the MMU and the at least one other MU is one of a wireless communication and a wired communication.

4. The method according to claim 1, wherein the data from the AP is one of data for a software upgrade, data for modifying a system configuration, encrypted security data, business operation data, and data for updating device drivers.

5. The method according to claim 4, wherein the encrypted security data is one of a key information and a certificate information.

6. The method according to claim 1, wherein the storage device is one of a non-removable memory within the MMU, a primary memory attached to the MMU via a bus, a universal serial bus ("USB") mass storage device (e.g., a memory stick), a secure digital ("SD") card, a mini SD card, a flash memory card, a smart media card, a Personal Computer Memory Card Industry Association card ("PCMCIA card"), and a subscriber identity module ("SIM") card.

7. The method according to claim 1, wherein the MMU has a plurality of slots for receiving the at least one other MU.

8. The method according to claim 1, further comprising: authenticating a further identity of the at least one other MU at the AP; and providing the MMU and the at least one other MU with access to a wireless local area network ("WLAN") from the AP.

9. A device, comprising:
    a connector coupling a storage device to the device, the storage device including data received from a network device previously coupled to the storage device, the data for authenticating an identity of the device at the network device; and
    a transceiver communicating with the network device to authenticate the device based on the data, wherein the device is provided access to a communications network via the network device when the device is authenticated, the transceiver further transmits the data to at least a first mobile unit ("MU"),
    wherein the network device authenticates an identity of the first MU based on the data provided to the first MU and provides the first MU access to the communications network based on the authentication of the first MU,
    wherein the device and the first MU transmit a periodic beacon signal to the network device and the network device disassociates one of the device and the first MU if the one of the device and the first MU fails to transmit the periodic beacon signal to the network device within a predetermined period of time, thereby denying access to the communications network to the one of the device and the first MU, and
    wherein the network device transmits a security alert if the one of the disassociated device and the disassociated first MU attempt to initiate communication with the network device.

10. The device according to claim 9, wherein the data transmitted from the transceiver includes one of data synchronization and data-replication between the MMU and the at least one other MU.

11. The device according to claim 9, wherein the network device is one of an access point ("AP") and a further MU.

12. The device according to claim 9, wherein the communication between the device and the first MU is one of a wireless communication and a wired communication.

13. The device according to claim 9, wherein the data received from the network device is one of data for a software upgrade, data for modifying a system configuration, encrypted security data, business operation data, and data for updating device drivers.

14. The device according to claim 13, wherein the encrypted security data is one of a key information and a certificate information.

15. The device according to claim 9, wherein the storage device is one of a non-removable memory within the MMU, a primary memory attached to the MMU via a bus, a universal serial bus ("USB") mass storage device (e.g., a memory stick), a secure digital ("SD") card, a mini SD card, a flash memory card, a smart media card, a Personal Computer Memory Card Industry Association card ("PCMCIA card"), and a subscriber identity module ("SIM") card.

16. The device according to claim 9, wherein the device has a plurality of slots for receiving at least the first MU.

17. A method, comprising:
    writing data onto a storage device from a first MU when the storage device is coupled to the first MU, the first MU having a wireless access to a communications network;
    providing the data from the first MU to a second MU when the storage device is coupled to the second MU;
    authenticating the identity of the second MU at the first MU based on the data provided to the second MU;
    transmitting the data from one of the first MU and the second MU to at least one further MU over the wireless network;

authenticating the identity of the at least one further MU at the first MU based on the data provided to the at least one further MU; and providing, to the second MU and the at least one further MU, the wireless access to the communications network via the first MU based on authentication of the second MU and the at least one further MU at the first MU;

transmitting a periodic beacon signal from the second MU and the at least one further MU to the first MU;

disassociating one of the second MU and the at least one further MU if the one of the second MU and the at least one further MU fails to transmit the periodic beacon signal to the first MU within a predetermined period of time, thereby denying access to the communications network to the one of the second MU and the at least one further MU; and transmitting a security alert if the one of the disassociated second MU and the at least one disassociated further MU attempt to initiate communication with the first MU.

* * * * *

UNITED STATES PATENT AND TRADEMARK OFFICE
CERTIFICATE OF CORRECTION

PATENT NO.         : 8,150,372 B2                                    Page 1 of 1
APPLICATION NO.    : 11/864151
DATED              : April 3, 2012
INVENTOR(S)        : Orlassino It is certified that error appears in the above-identified patent and that said Letters Patent is hereby corrected as shown below:

In Column 6, Line 44, delete "101" and insert -- 110 --, therefor.

In Column 10, Line 42, delete "Mus" and insert -- MUs --, therefor.

Signed and Sealed this
First Day of January, 2013

David J. Kappos
*Director of the United States Patent and Trademark Office*